United States Patent
Shiomi

(10) Patent No.: US 7,823,776 B2
(45) Date of Patent: Nov. 2, 2010

(54) MEDIUM PROCESSING SYSTEM AND INTERMEDIARY MEDIUM PROCESSING APPARATUS

(75) Inventor: Toshiro Shiomi, Nagano (JP)

(73) Assignee: Nidec Sankyo Corporation (JP)

( * ) Notice: Subject to any disclaimer, the term of this patent is extended or adjusted under 35 U.S.C. 154(b) by 2 days.

(21) Appl. No.: 11/913,379

(22) PCT Filed: Apr. 16, 2007

(86) PCT No.: PCT/JP2007/058254
§ 371 (c)(1),
(2), (4) Date: Oct. 29, 2008

(87) PCT Pub. No.: WO2007/125776
PCT Pub. Date: Nov. 8, 2007

(65) Prior Publication Data
US 2009/0065577 A1 Mar. 12, 2009

(30) Foreign Application Priority Data
Apr. 28, 2006 (JP) .............................. 2006-126350

(51) Int. Cl.
*G06K 5/00* (2006.01)
(52) U.S. Cl. ........................................ 235/380; 235/375
(58) Field of Classification Search ................ 235/380, 235/492, 451, 441, 487
See application file for complete search history.

(56) References Cited

U.S. PATENT DOCUMENTS

| | | | | |
|---|---|---|---|---|
| 6,655,588 B2 * | 12/2003 | Fukazawa | .................... | 235/437 |
| 7,376,145 B2 * | 5/2008 | Holub-Gorny et al. | ...... | 370/463 |
| 7,409,442 B2 * | 8/2008 | Basham et al. | .............. | 709/223 |
| 2004/0252566 A1 * | 12/2004 | Chang et al. | ................. | 365/202 |
| 2005/0268020 A1 * | 12/2005 | James | ........................ | 710/305 |
| 2005/0279839 A1 * | 12/2005 | Kuo et al. | .................... | 235/492 |
| 2009/0083406 A1 * | 3/2009 | Harrington et al. | .......... | 709/222 |

FOREIGN PATENT DOCUMENTS

| | | |
|---|---|---|
| JP | 2001-60901 | 3/2001 |
| JP | 3241254 | 10/2001 |
| JP | 2005-25385 | 1/2005 |
| JP | 2005-78642 | 3/2005 |

* cited by examiner

*Primary Examiner*—Edwyn Labaze
(74) *Attorney, Agent, or Firm*—Cantor Colburn LLP

(57) ABSTRACT

A medium processing system for use with an information recording medium is disclosed. The system may include a first medium processing apparatus, a host apparatus, and a second medium processing apparatus. The first medium processing apparatus may be structured to carry out writing and reading information to and from the information recording medium. The host apparatus may have an interface with which the first medium process apparatus is connectable. The second medium processing apparatus may be structured to intermediate a connection between the first medium processing apparatus and the host apparatus. The second medium processing apparatus may also be structured to carry out writing and reading information to and from the information recording medium at a higher speed than the first medium processing apparatus does.

11 Claims, 6 Drawing Sheets

[FIG.1]
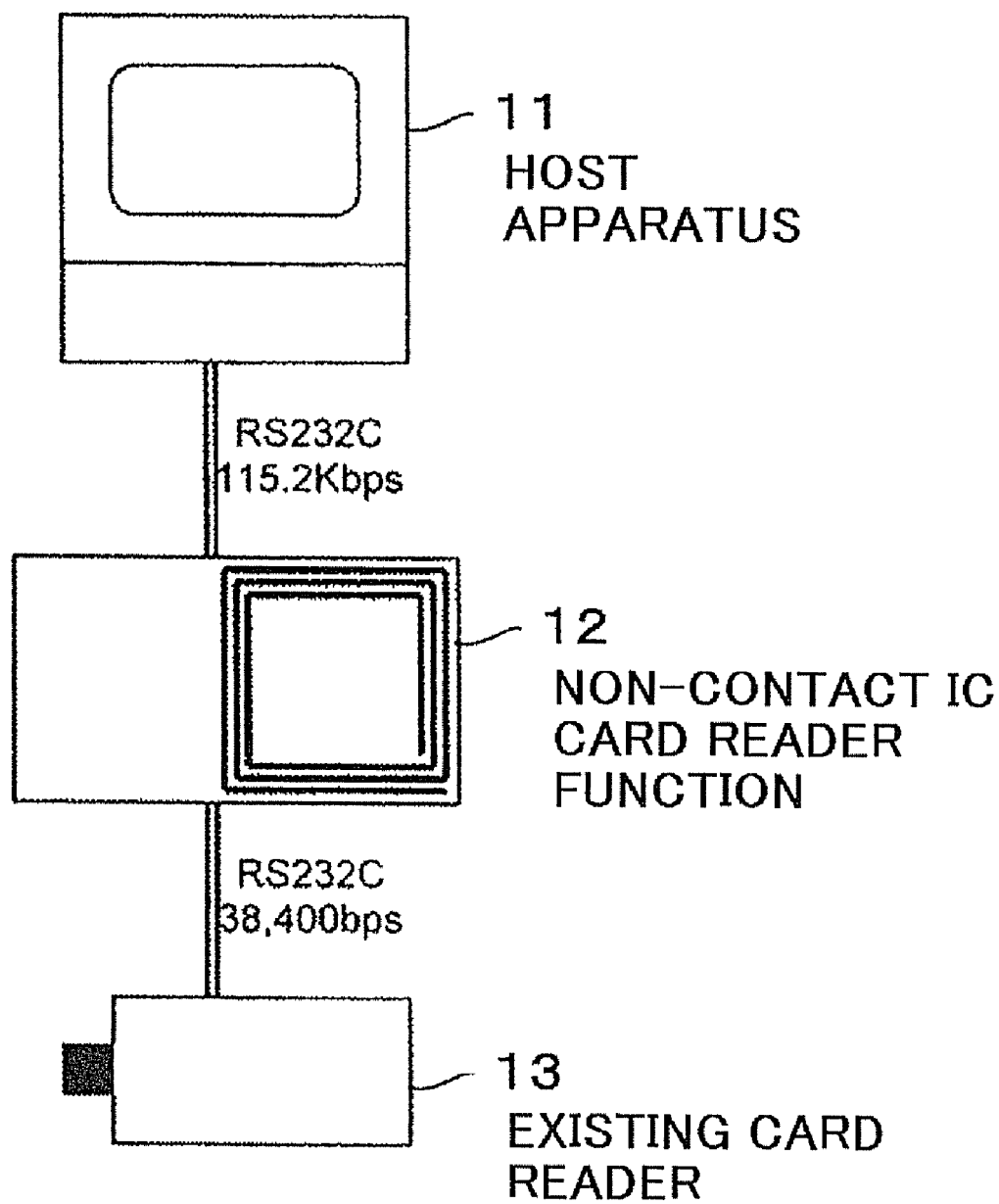

[FIG.2]
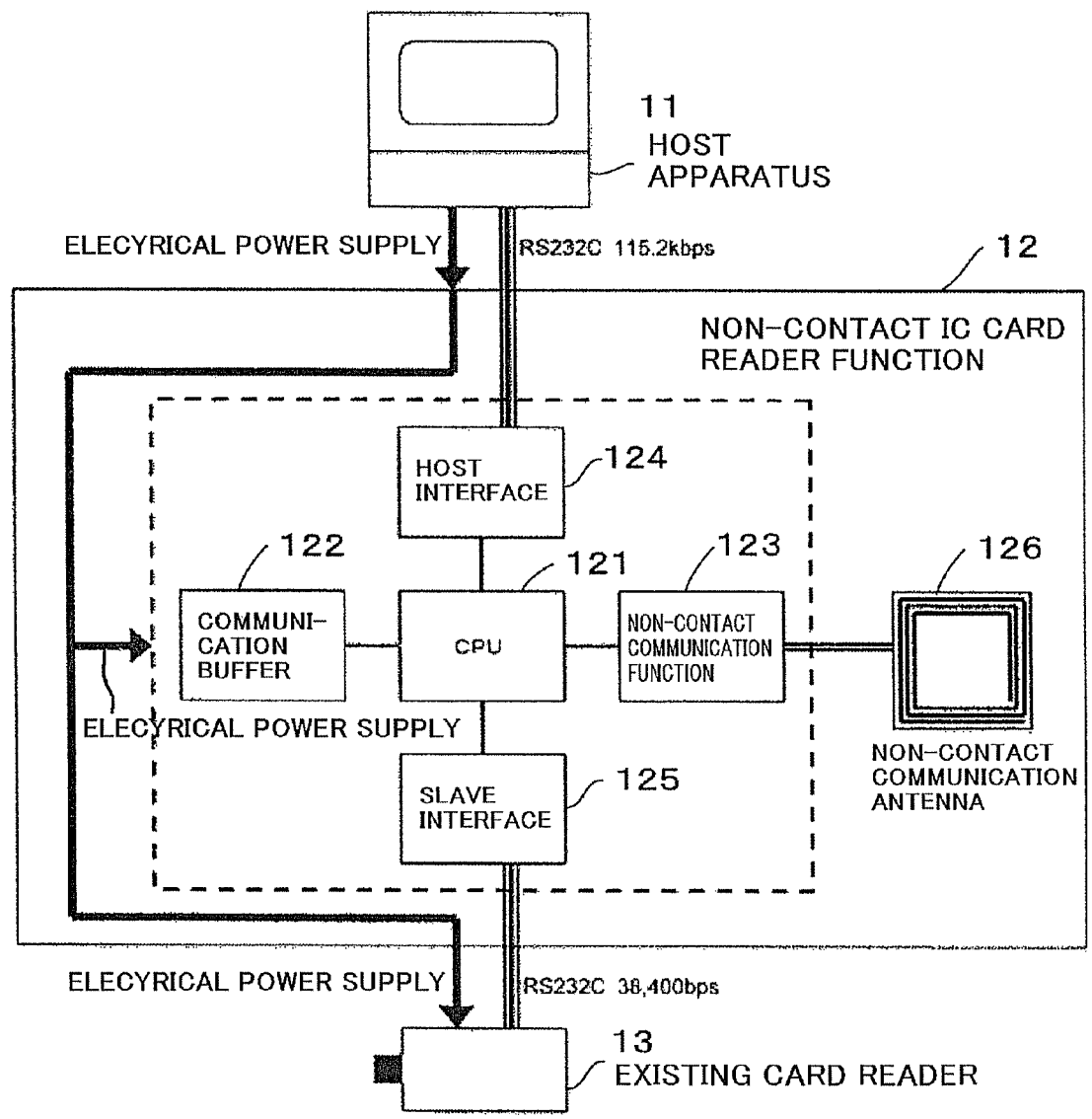

[FIG.3]
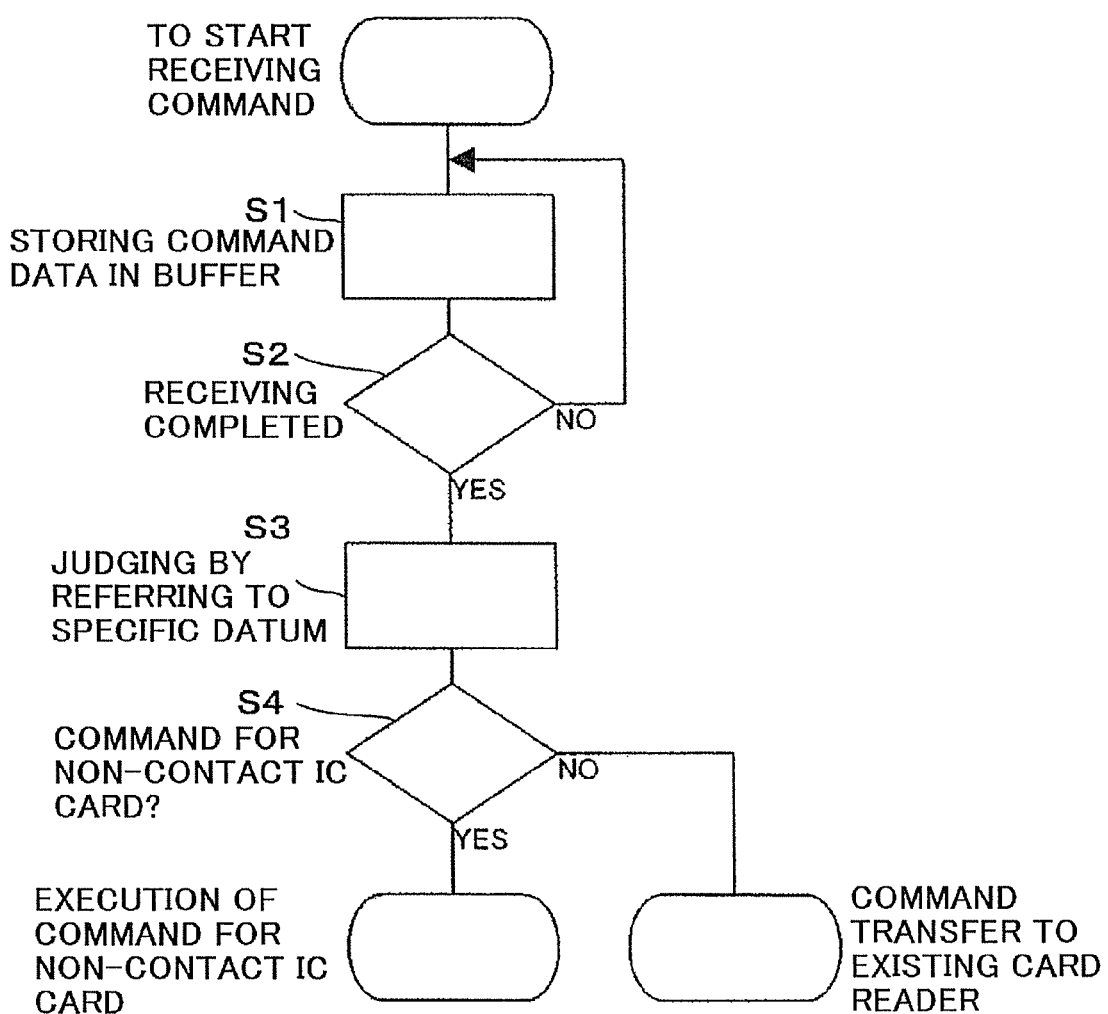

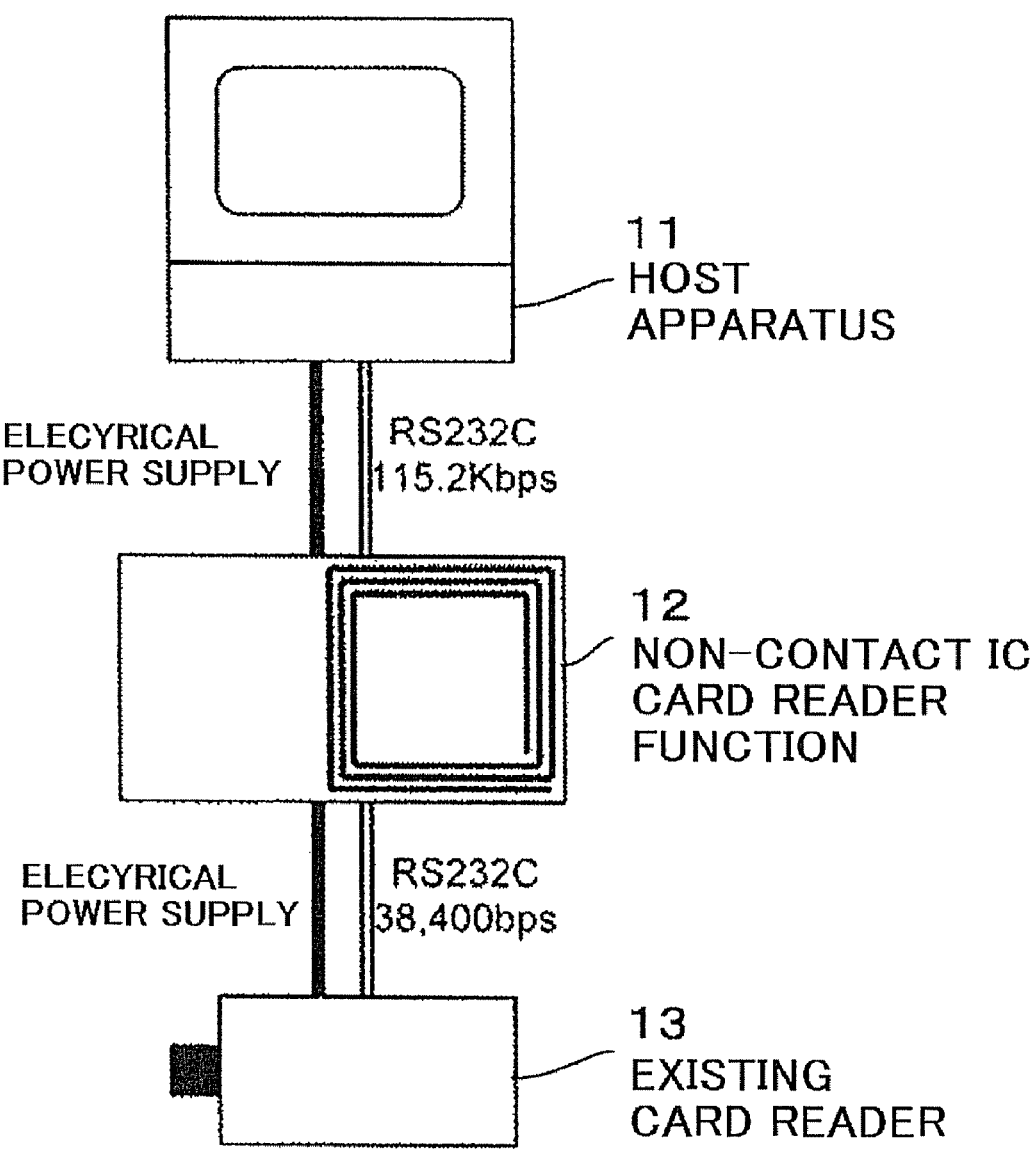

[FIG. 5]
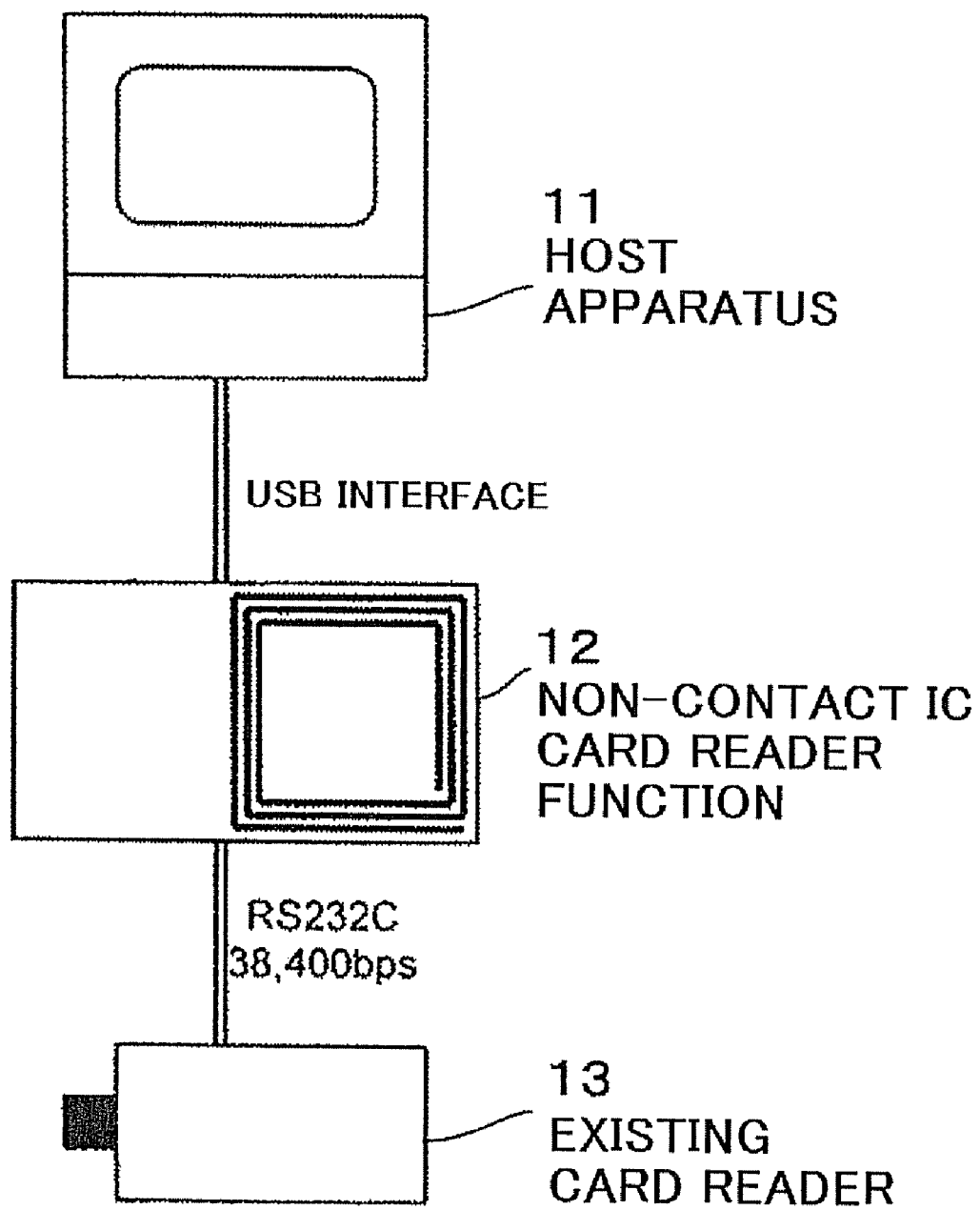

[FIG. 6]
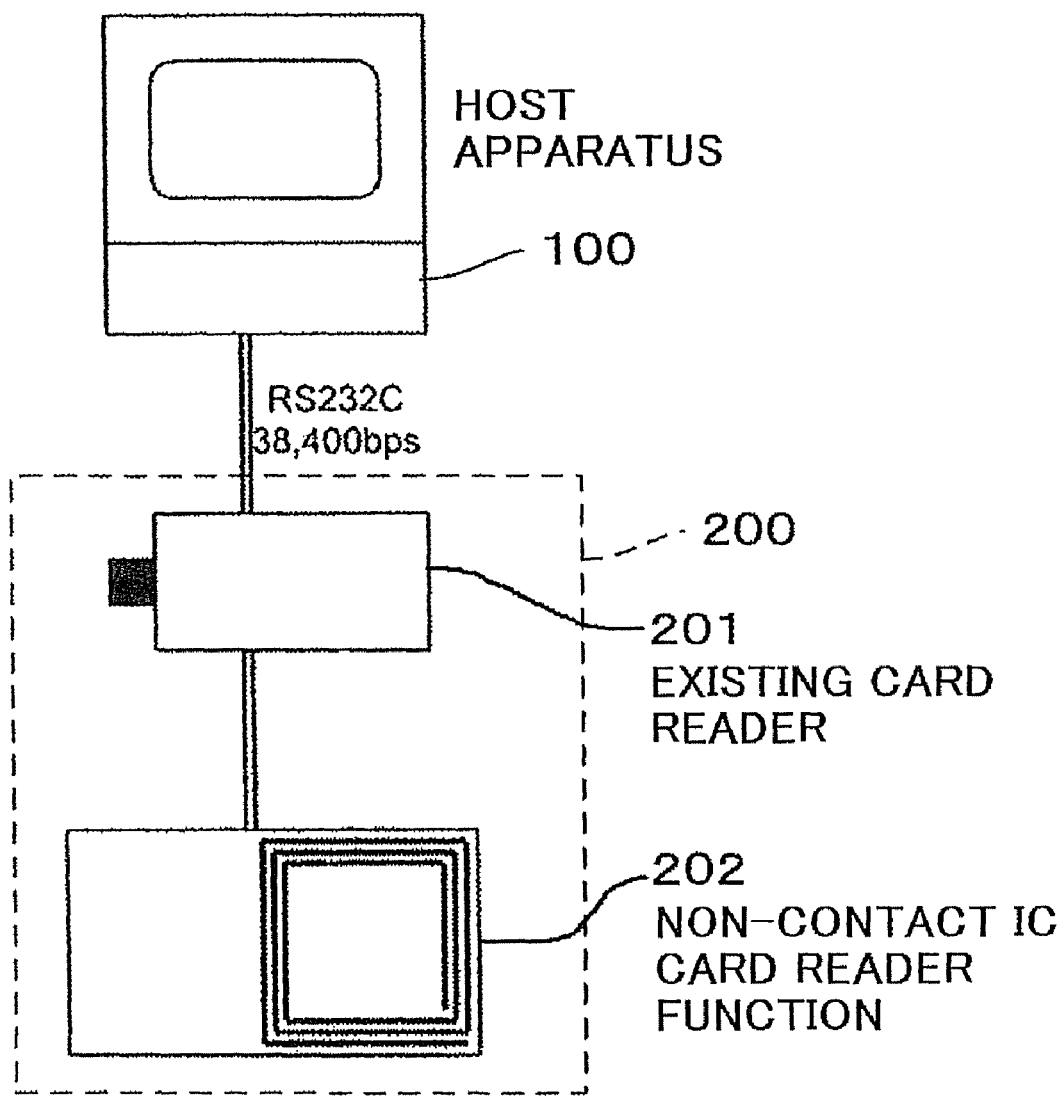
PRIOR ART

MEDIUM PROCESSING SYSTEM AND INTERMEDIARY MEDIUM PROCESSING APPARATUS

CROSS REFERENCE TO RELATED APPLICATION

This is a U.S. national stage of application No. PCT/JP2007/058254, filed on Apr. 16, 2007. Priority under 35 U.S.C. §119(a) and 35 U.S.C. §365(b) is claimed from Japanese Application No. JP-2006-126350, filed Apr. 28, 2006, the disclosure of which is also incorporated herein by reference.

FIELD OF THE INVENTION

At least an embodiment of the present invention relates to a medium processing system in which information data is sent and received between a medium processing apparatus and a host apparatus connected to the medium processing apparatus, as well as an intermediary medium processing apparatus.

BACKGROUND OF THE INVENTION

Being conventionally used as a bank card and/or a card for implementation of personal authentication in financial institutions and so on, there are a magnetic card made by forming a magnetic stripe on a plastic substrate surface, and a contact IC card in which an integrated circuit chip (IC chip) is embedded inside a plastic substrate and an IC terminal is placed on a surface of the plastic substrate. Then, writing and reading information data for such a magnetic card and a contact IC card is carried out by using a card reader equipped with a magnetic head and a IC contact.

Meanwhile, in recent years, there has appeared a non-contact card in which an IC chip and an antenna coil are embedded and writing and reading information data is carried out via the antenna coil by means of electromagnetic interaction. Such a non-contact IC card is provided with a memory capacity and a security level that are equivalent to what a contact IC card has. Furthermore, being compared to a magnetic card and the contact IC card with which data is sent and received while those cards are sliding (contacting), the non-contact IC card is excellent at operation performance (what a user has to do is only holding up the non-contact IC card) and maintainability (there exists no contacting part). Then, writing and reading information data for the non-contact IC card is carried out by a card reader that is equipped with an antenna for generating an electromagnetic wave.

Moreover, developed in recent years is an IC card reader provided with a hybrid function, with which all of the magnetic card, contact IC card, and non-contact IC card described above can be handled and processing for each card can be implemented (For example, refer to Patent Document 1). An IC card reader disclosed in Patent Document 1 includes; a magnetic head with which magnetic data is sent and received to/from a magnetic stripe of a magnetic card; an IC contact with which data is sent and received to/from an IC contact of a contact IC card; and a sending and receiving antenna with which data is sent and received to/from an antenna coil of a non-contact IC card.

On this occasion, in the view from a host apparatus such as an ATM; it is desirable in terms of control operation that there exists one and only device which handles various cards including a magnetic card, a contact IC card, a non-contact IC card, and so on. Furthermore, a device interface (for example, RS232C), which the host apparatus is equipped with, is limited in its number. Therefore, in the case of an IC card reader provided with a hybrid function, usually only a card reader for a magnetic card or a contact IC card is connected to the host apparatus, and then a control circuit for a non-contact IC card is additionally connected to the card reader.

FIG. 6 is a block diagram showing an electrical system structure of a conventional medium processing system.

As shown in FIG. 6, only an existing card reader 201 for a magnetic card or a contact IC card in an IC card reader 200 is connected to a host apparatus 100 with an RS232C interface. Then, a non-contact IC card reader function 202 (such as an antenna coil, a control circuit, and so on) is mounted onto (additionally connected to) the existing card reader 201.

Japanese Patent No. 3241254 (FIG. 1) relates to a conventional IC card reader.

Unfortunately, there exist problems described below in a conventional medium processing system.

A first point is that the non-contact IC card reader function 202 is able to carry out high-speed communication with a non-contact IC card (for example, a communication speed in the case is about 10 times faster than a communication speed of a case where the existing card reader 201 communicates with a contact IC card). Naturally it is desirable that a function of the high-speed communication is utilized. However, since the existing card reader 201 is connected to the host apparatus 100 via the RS232C interface (with a communication speed, for example, of 38,400 bps) in the conventional medium processing system, the non-contact IC card reader function 202 is able to access to the host apparatus 100 only through the existing card reader 201 (Refer to FIG. 6) so that an advantage of the high-speed communication cannot be utilized sufficiently.

Furthermore, when the non-contact IC card reader function 202, being for example as a separate circuit board, is additionally connected to the existing card reader 201, it is necessary to have some design specification change at a side of the existing card reader 201. However, it is not only extremely complicated but also unpractical to additionally connect such a function for taking into account some possible refurbishment required in the market (non-contact IC card reader function) to the existing card reader 201. Moreover, in a case of the existing card reader 201 that has already obtained for example an approval certification and so on, it becomes necessary to obtain a certification again due to the specification change and then such additional work is unpractical and furthermore it costs much.

At least an embodiment of the present invention is materialized in view of the problems described above, and at least an embodiment of the present invention provides a medium processing system that includes medium processing apparatuses, in which communication speeds for information recording media are different, and is able to take advantage of high-speed communication, and provides such a medium processing system and an intermediary medium processing apparatus that are practical and low-cost.

SUMMARY OF THE INVENTION

To solve the problems identified above, at least an embodiment of present invention may include:

(1) A medium processing system including: a first medium processing apparatus that carries out writing and reading information data to/from an information recording medium; a host apparatus having an interface with which the first medium processing apparatus is connectable; and a second medium processing apparatus that intermediates connection between the first medium processing apparatus and the host apparatus; wherein the second medium processing apparatus carries out writing and reading information data to/from an information recording medium at a higher speed than the first medium processing apparatus does.

According to at least an embodiment of the present invention, the medium processing system includes the first medium processing apparatus, and the second medium processing apparatus that intermediates connection to the host apparatus having an interface with which the first medium processing apparatus is connectable. Then, the second medium processing apparatus carries out writing and reading information data to/from an information recording medium at a higher speed than the first medium processing apparatus does. Therefore, at the second medium processing apparatus that carries out information data processing at a relatively higher speed in comparison with the first medium processing apparatus, information data processing can be carried out without taking care of the presence of the first medium processing apparatus that carries out information data processing at a relatively lower speed so that it becomes possible to take advantage of high-speed communication.

According to at least an embodiment of the present invention especially, the second medium processing apparatus can be added to the host apparatus, to which conventionally the first medium processing apparatus has been connected, without newly adding any interface. Thus, while the number of interfaces for devices, which the host apparatus has, being minimized (for example, one interface) and without adding any design specification change to the first medium processing apparatus, the second medium processing apparatus can be installed into the medium processing system. As a result, the setup described above is able to contribute to a cost reduction and improvement of practicality.

(2) The medium processing system according to item (1): wherein the first medium processing apparatus carries out writing and reading magnetic data to/from an information recording medium; and meanwhile the second medium processing apparatus carries out writing and reading information data to/from an information recording medium by means of electromagnetic induction in a non-contact manner.

According to at least an embodiment of the present invention, the first medium processing apparatus carries out writing and reading magnetic data to/from an information recording medium and meanwhile the second medium processing apparatus carries out writing and reading information data to/from an information recording medium by means of electromagnetic induction in a non-contact manner. Therefore, even though writing and reading magnetic data to/from a magnetic card is carried out at a low speed, sending and receiving data to a non-contact IC card can be carried out at a high speed.

For example, in a case especially where the first information data processing apparatus has already obtained an approval certification, etc., and adopted there is a conventional system structure (Refer to FIG. 6) in which the second information data processing apparatus (the non-contact IC card reader function 202 in FIG. 6) is additionally connected to the first information data processing apparatus (the existing card reader 201 in FIG. 6), it becomes necessary to obtain a certification again due to the specification change and then such additional work is unpractical and furthermore it costs much. However, according to at least an embodiment of the present invention, it is not necessary to add any design specification change to the first medium processing apparatus, and therefore obtaining a certification again as described above is not required so that a practical and low-cost medium processing system can be constructed.

(3) The medium processing system according to item (2): wherein the first medium processing apparatus includes an IC contact that contacts with an IC terminal placed on an information recording medium.

According to at least an embodiment of the present invention, the first medium processing apparatus includes an IC contact that contacts with an IC terminal placed on an information recording medium, and therefore it is possible to construct a hybrid medium processing system which includes both contact IC communication and non-contact IC communication (or magnetic data communication) and to take advantage of high-speed non-contact IC communication.

(4) The medium processing system according to any of item (1) through item (3): wherein the second medium processing apparatus includes a buffer that temporarily stores a command from the host apparatus.

According to at least an embodiment of the present invention, the second medium processing apparatus described above includes a buffer that temporarily stores a command from the host apparatus so that a processing speed difference between the first medium processing apparatus, which carries out magnetic data processing at a relatively low speed, and the second medium processing apparatus, which carries out non-contact information data processing at a relatively high speed can be canceled, and eventually both the medium processing apparatuses can carry out information data processing at an appropriate speed.

Additionally, in at least an embodiment of the present invention, the buffer can store a command to the first medium processing apparatus from the host apparatus and/or a command to the second medium processing apparatus from the host apparatus. Furthermore, the number of buffers may be one or two (one for the first medium processing apparatus and the other for the second medium processing apparatus).

(5) The medium processing system according to item (4): wherein the buffer temporarily stores a command from the host apparatus to the first medium processing apparatus.

According to at least an embodiment of the present invention, the buffer described above temporarily stores a command from the host apparatus to the first medium processing apparatus so that cancellation of a command due to an overflow and so on can be avoided even if the first medium processing apparatus has a low processing speed.

(6) The medium processing system according to item (5): wherein the buffer furthermore temporarily stores a command from the host apparatus to the second medium processing apparatus.

According to at least an embodiment of the present invention, the buffer described above temporarily stores a command from the host apparatus to the second medium processing apparatus so that information data processing of the second medium processing apparatus can get started at appropriate timing.

(7) The medium processing system according to item (5): wherein the second medium processing apparatus includes: a communication section that carries out writing and reading information data to/from an information recording medium; and a control section connected to the communication section and the buffer; and when having received a command from the host apparatus, the control section judges the command from the host apparatus to be for the first medium processing apparatus if so, and transfers the command to the buffer; and meanwhile the control section judges the command from the host apparatus to be for the second medium processing apparatus if so, and transfers the command to the communication section.

According to at least an embodiment of the present invention, the second medium processing apparatus includes not only a buffer but also a communication section that carries out writing and reading information data to/from an information recording medium, and a control section connected to the communication section and the buffer. Then, at the time of having received a command from the host apparatus, the control section transfers the command to the buffer if the command from the host apparatus is for the first medium processing apparatus; and meanwhile the control section transfers the command to the communication section if the command from the host apparatus is for the second medium processing apparatus. Therefore, the first medium processing apparatus, which carries out magnetic data processing at a relatively low speed, and the second medium processing apparatus, which carries out non-contact information data processing at a relatively high speed, can each carry out sending and receiving a command at an appropriate processing speed efficiently.

(8) The medium processing system according to item (6): wherein the control section judges a command from the host apparatus among commands stored in the buffer to be for the first medium processing apparatus if so, and transfers the command to the first medium processing apparatus; and meanwhile the control section judges a command from the host apparatus to be for the second medium processing apparatus if so, and transfers the command to the communication section.

According to at least an embodiment of the present invention, the control section described above transfers a command, which is received from the host apparatus for the first medium processing apparatus, to the first medium processing apparatus from the buffer; and meanwhile the control section transfers a command, which is received from the host apparatus for the second medium processing apparatus, to the communication section from the buffer. Therefore, both the medium processing apparatuses are able to efficiently carry out information data processing.

(9) The medium processing system according to any of item (1) through item (8): wherein the second medium processing apparatus includes a function for spontaneously controlling the first medium processing apparatus.

According to at least an embodiment of the present invention, the second medium processing apparatus described above includes a function for spontaneously controlling the first medium processing apparatus, and therefore it is possible without any command from the host apparatus to carry out information data processing between the first medium processing apparatus and the second medium processing apparatus. Accordingly, for example, a processing operation such as exclusive processing between the first medium processing apparatus and the second medium processing apparatus (one of the medium processing apparatuses is operating, the other is kept out of operation) can be carried out at a high speed, and furthermore it is possible to reduce a load of operation of the host apparatus.

(10) The medium processing system according to any of item (1) through item (9): wherein the second medium processing apparatus includes a function for automatically recognizing a sort of the first medium processing apparatus.

According to at least an embodiment of the present invention, the second medium processing apparatus described above includes a function for automatically recognizing a sort of the first medium processing apparatus, and therefore it is possible without receiving any command from the host apparatus to autonomously realize the function of item (9) compatible with the first medium processing apparatus.

(11) An intermediary medium processing apparatus including: an intermediary of connection between a medium processing apparatus for writing and reading information data to/from an information recording medium and a host apparatus having an interface with which the medium processing apparatus is connectable; wherein the intermediary medium processing apparatus carries out writing and reading information data to/from an information recording medium at a higher speed than the medium processing apparatus does.

According to at least an embodiment of the present invention, the intermediary medium processing apparatus corresponds to the second medium processing apparatus of the medium processing apparatuses described above, and therefore it is possible to take advantage of high-speed communication without taking care of the presence of a medium processing apparatus that carries out information data processing at a relatively lower speed (for example, a magnetic card reader).

According to a medium processing system and an intermediary medium processing apparatus relating to at least an embodiment of the present invention, as described above; even in a medium processing system including medium processing apparatuses in which communication speeds for information recording media are different, advantage of high-speed communication of a medium processing apparatus having a higher communication speed can be utilized and it is furthermore possible to construct a practical and low-cost system.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1 is a block diagram showing an electrical system structure of a medium processing system relating to at least an embodiment of the present invention.

FIG. 2 is a block diagram showing an electrical system structure of a medium processing system relating to at least an embodiment of the present invention.

FIG. 3 is a flow chart showing system operation of a medium processing system relating to at least an embodiment of the present invention.

FIG. 4 is a block diagram showing an electrical system structure of a medium processing system relating to at least an embodiment of the present invention.

FIG. 5 is a block diagram showing an electrical system structure of another medium processing system relating to at least an embodiment of the present invention.

FIG. 6 is a block diagram showing an electrical system structure of a conventional medium processing system.

DETAILED DESCRIPTION OF THE PREFERRED EMBODIMENTS

Preferred embodiments of the present invention is described below with reference to the accompanying drawings.

FIG. 1 is a block diagram showing an electrical system structure of a medium processing system relating to at least an embodiment of the present invention.

In FIG. 1, a medium processing system relating to the present embodiment includes a host apparatus 11, a non-contact IC card reader function (circuit) 12, and an existing card reader 13. Incidentally, in the present embodiment, the existing card reader 13 is adopted as a first medium processing apparatus while the non-contact IC card reader function 12 is adopted as a second medium processing apparatus. However, the present invention is not limited to the above arrangement. For example, it is also possible to adopt a printer or an image processing system as the second medium processing apparatus. In other words, it does not matter what device is adopted as the first information data processing apparatus and the second information data processing apparatus, as far as the second medium processing apparatus writes and reads to/from an information recording medium faster than the first medium processing apparatus does.

In FIG. 1, the host apparatus 11 is an apparatus that sends a command relating to a motion instruction to the non-contact IC card reader function 12 and the existing card reader 13. For example, a monetary transaction terminal device and an ID authentication terminal device may be listed as the host apparatus 11. Furthermore, the host apparatus 11 includes a single interface (not illustrated) to which the non-contact IC card reader function 12 may be connected.

The non-contact IC card reader function 12 includes a CPU 121 and a non-contact communication antenna 126 (Refer to FIG. 2 to be described later). Then, according to a command from the host apparatus 11, information data is written and read to/from a non-contact IC card via the non-contact communication antenna 126 by means of electromagnetic induction in a non-contact manner.

The existing card reader 13 includes a magnetic head (not illustrated) that contacts with and slides over a magnetic stripe of a magnetic card so as to carry out read/write processing (writing operation or reading operation) for the magnetic card, an IC contact (not illustrated) that makes contact with an IC terminal placed on a contact IC card so as to carry out communication processing for the contact IC card, and so on. Then, according to a command from the host apparatus 11, information data is written and read to/from the magnetic card and the contact IC card via the magnetic head and the IC contact.

As shown in FIG. 1 on this occasion, the non-contact IC card reader function 12 (an intermediary medium processing apparatus) intermediates a connection between the existing card reader 13 and the host apparatus 11, and then carries out information processing faster than the existing card reader 13 does. More concretely to describe, the existing card reader 13 is connected to the non-contact IC card reader function 12 through an RS232C interface (The communication speed is 38,400 bps), and meanwhile the non-contact IC card reader function 12 is connected to the host apparatus 11 through another RS232C interface (The communication speed is 115.2 Kbps). Therefore, at the non-contact IC card reader function 12, information data processing can be carried out without taking care of the presence of the existing card reader 12 that carries out information data processing at a speed lower than the speed of the non-contact IC card reader function 12 so that it becomes possible to take advantage of high-speed communication of the non-contact IC card reader function 12.

According to a medium processing system shown in FIG. 1 especially, the non-contact IC card reader function 12 can be added to the host apparatus 11, to which conventionally the existing card reader 13 has been connected, without newly adding any interface. Furthermore, there is no need of adding any design specification change to the existing card reader 13. Therefore, consequently it is possible to install the non-contact IC card reader function 12 into the medium processing system in a low-cost and practical manner.

Next, a detailed electrical structure of the non-contact IC card reader function 12 is described with reference to FIG. 2.

FIG. 2 is a block diagram showing an electrical system structure of a medium processing system relating to the present embodiment. FIG. 2 especially shows an electrical structure of the non-contact IC card reader function 12 in detail.

In FIG. 2, the non-contact IC card reader function (circuit) 12 includes; the CPU 121, a communication buffer 122, a non-contact communication function (circuit) 123, a host interface 124, a slave interface 125, and the non-contact communication antenna 126. Incidentally, a non-contact IC card reader circuit (a section enclosed with a dotted line frame in the drawing) is constructed with various electrical elements including the CPU 121, the communication buffer 122, the non-contact communication function 123, the host interface 124, and the slave interface 125. Furthermore, being connected with a cable, the non-contact communication antenna is detachable from the non-contact IC card reader circuit (the section enclosed with the dotted line frame in the drawing).

The CPU 121 controls not only communication with the host apparatus 11 as well as the existing card reader 13 by using a firmware program but also a communication function to/from the non-contact communication antenna 126 through the non-contact communication function 123. Furthermore, when the CPU 121 receives a command for communication with a non-contact IC card from the host apparatus 11, the non-contact communication function 123 is controlled by the CPU 121 so as to directly communicate with the non-contact IC card.

The host interface 124 receives a command from the host apparatus 11 for the non-contact IC card reader function 12 and the existing card reader 13, and furthermore sends a response from the non-contact IC card reader function 12 and the existing card reader 13. Additionally, for the purpose of materializing high speed processing of communication with a non-contact IC card that can be executed only by the host apparatus 11 and the non-contact IC card reader function 12, it is desirable that a communication speed of the interface is preferably as fast as the host apparatus 11 allows.

Being connected to the existing card reader 13, the slave interface 125 transfers a command from the host apparatus 11 to the existing card reader 13, and furthermore receives a response from the existing card reader 13 that is a result of execution of the command. Incidentally, in a case where the slave interface 125 is equipped with control lines (for example, 4 control lines) in addition to a line for sending and receiving data, connecting the control lines to the CPU 121 makes it possible for the CPU 121 to control the control lines. Moreover, it is required that a communication speed of the interface is what the existing card reader 13 is able to cope with.

On this occasion, the non-contact IC card reader function 12 of the medium processing system relating to the present embodiment includes the communication buffer 122, as described above. A command, which is sent from the host apparatus 11 to the non-contact IC card reader function 12 and the existing card reader 13, is received from the host apparatus 11 at a communication speed of the host interface 125. Then, the command is once stored in the communication buffer 122 by the CPU 121. Then, according to a specific datum of the command stored in the communication buffer 122, the CPU 121 discriminates either the command is for the non-contact IC card reader function 12 or it is for the existing card reader 13. If the command is for the existing card reader 13, the command stored in the communication buffer 122 is transferred to the existing card reader 13 by the CPU 121. On the other hand, if the command is for the non-contact IC card reader function 12, the command stored in the communication buffer 122 is transferred to the non-contact communication function 123 by the CPU 121.

A response from the existing card reader 13 is received at a communication speed of the slave interface 125. Then, the response is once stored in the communication buffer 122 by the CPU 121. Afterwards, the response stored in the communication buffer 122 is transferred to the host apparatus 11 at a communication speed of the host interface 125 by the CPU 121.

Additionally, as a thick line with arrows shows in FIG. 2, the existing card reader 13 is supplied with electricity from the host apparatus 11 through the non-contact IC card reader function 12. Furthermore, in the present embodiment, a device interface type of the host apparatus 11 is RS232C, and therefore the device interface type is compatible in general with a communication speed of 115.2 Kbps. By taking advantage of the communication speed performance; making the host interface 124 of the non-contact IC card reader function 12, which is directly connected to the host apparatus 11, compatible with a communication speed of 115.2 Kbps improves the communication speed about 3 times faster, being compared with a case where the non-contact IC card reader function 12 is connected at a lower position of the existing card reader 13. Furthermore, in comparison to the interface of the non-contact IC card reader function 12 with the host apparatus 11, the interface with the existing card reader 13 connected at a lower position is slower in the communication speed. In order to cope with the communication speed difference, a command from the host and a response from the slave are once stored in the communication buffer 122 by the non-contact IC card reader function 12 (Thus the communication speed difference can be canceled).

Next, system operation of the medium processing system shown in FIG. 2 is described with reference to FIG. 3. FIG. 3 is a flow chart showing system operation of a medium processing system relating to at least an embodiment of the present invention. A flowchart of FIG. 3 especially focuses on a flow of information processing in the non-contact IC card reader function 12.

In FIG. 3, having started receiving command data from the host apparatus 11, the non-contact IC card reader function 12 transfers the command data to the communication buffer 122 and stores the command data in the communication buffer 122 (Step S1).

Next, it is judged whether all command data has already received or not (Step S2). If all command data has not received yet, a procedure of Step S1 is repeated. On the other hand, if it is judged that all command data has already received, an access is made to the communication buffer 122, and then it is judged by referring to a specific datum whether the command data is for the non-contact IC card reader function 12 or for the existing card reader 13 (Step S3).

In relation to a procedure of Step S3, it is preferable, for example, that a command sorting system is adopted for a command sent from the host apparatus 11. That is to say; in order to simplify a conversion function at a relaying operation, it is preferable that the host interface 122 and the slave interface 123 of the non-contact IC card reader function 12 have the same specifications if possible. Furthermore, from the viewpoint of standardizing specifications, a sorting method that is independent of command specification details of the existing card reader 13 is preferred. For example; by a change in a data part, being common to all commands, of a command data string (for example, uppercase letters and lower letters are discriminatingly used), a command for the non-contact IC card reader function 12 and a command for the existing card reader 13 are discriminated from each other. Thus, a requirement described above is satisfied so that command sorting can be done efficiently.

Next, in the procedure of Step S3; if the CPU 121 judges a command to be for a non-contact IC card (Step S4: "YES"), the command is executed as a command for a non-contact IC card. More concretely to describe, the non-contact communication function 123 gets operated and an access is made to the non-contact IC card via the non-contact communication antenna 126. On the other hand, if the CPU 121 judges the command not to be a non-contact IC card (Step S4: "NO"), the command is transferred to the existing card reader 13.

As described above with reference to FIG. 2 and FIG. 3, provided in the medium processing system relating to the present embodiment is the communication buffer 122 in which a command from the host apparatus 11 to the existing card reader 13 is temporarily stored, and therefore both the non-contact IC card reader function 12 and the existing card reader 13 are able to carry out information data processing at each appropriate speed. Furthermore, a command from the host apparatus 11 to the non-contact IC card reader function 12 is also stored temporarily in the communication buffer 122, and therefore information data processing of the non-contact IC card reader function 12 can get started at appropriate timing.

Moreover, the non-contact IC card reader function 12 includes the non-contact communication function 123 (a communication section) that carries out writing and reading information data to/from a non-contact IC card, and the CPU 121 (a control section) that is connected to the non-contact communication function 123 as well as the communication buffer 122. Under a condition described above; while a command is received from the host apparatus 11, it is possible to have a setup in which a command from the host apparatus 11 for the existing card reader 13 is judged by the CPU 121 to be so and then the command is transferred to the communication buffer 122, and meanwhile a command from the host apparatus 11 for the non-contact IC card reader function 12 is judged by the CPU 121 to be so and then the command is transferred to the non-contact communication function 123. According to the setup described above, both the existing card reader 13, which carries out magnetic data processing at a relatively low speed, and the non-contact IC card reader function 12, which carries out a non-contact information data processing at a relatively high speed, are each able to send and receive a command at an appropriate processing speed efficiently.

Furthermore, it is possible to have a setup in which, among the commands stored in the communication buffer 122, a command from the host apparatus 11 for the existing card reader 13 is judged by the CPU 121 to be so and then the command is transferred to the existing card reader 13, and meanwhile a command from the host apparatus 11 for the non-contact IC card reader function 12 is judged by the CPU 121 to be so and then the command is transferred to the non-contact communication function 123. According to the setup described above, both the devices are able to carry out information data processing efficiently.

Additionally, a setup may be so made that the non-contact IC card reader function 12 spontaneously controls the existing card reader 13. More concretely to describe, for example; in a case of a system in which exclusive processing between a non-contact IC card and any other card is executed, the non-contact IC card reader function 12 issues a command for a shutter to the existing card reader 13 when non-contact IC card is recognized. Moreover, it is also possible for the existing card reader 13 to be controlled spontaneously by a control line of the slave interface 125. For example, in a case of an RS232C interface, the existing card reader 13 can be controlled through operation of a DSR signal and an RTS signal.

Furthermore, as described above; it is possible to add the non-contact IC card reader function 12 without any change on the existing card reader 13. Moreover, in a case of the non-contact IC card reader function 12 provided with such a function described above, there exists a requirement of connection to multiple sorts of sets of the existing card reader 13. On the other hand, a setup may be so made that the non-contact IC card reader function 12 is provided with a function for controlling the sets of the existing card reader 13 at a slave position spontaneously, and therefore different controls are required for the multiple sorts of sets of the existing card reader 13. Then, the non-contact IC card reader function 12 automatically recognizes the sort of each set of the existing card reader 13 at a slave position, and switches a control for the slave device to enable satisfying the requirement. In the present embodiment, a command is sent from the non-contact IC card reader function 12 to the existing card reader 13; and then according to a response condition for the command, a sort of each connected set of the existing card reader 13 is recognized automatically.

Still further, in the present embodiment; the non-contact IC card reader function 12 is inserted and connected between the host apparatus 11 and the existing card reader 13 for a relaying operation. Taking it into consideration to carry out installation work at a job site in a market, a host interface connector of the non-contact IC card reader function 12 is prepared to be the same as an interface connector of the existing card reader 13 so that adding a function can be carried out more easily.

(Modification)

FIG. 4 is a block diagram showing an electrical system structure of a medium processing system relating to at least an embodiment of the present invention. FIG. 5 is a block diagram showing an electrical system structure of another medium processing system relating to at least an embodiment of the present invention. Incidentally, a structure of the system shown in FIG. 4 is the same as a structure of the system shown in FIG. 2

As shown in FIG. 4, in the system structure shown in FIG. 2; an electrical power supply line for the existing card reader 13 is so connected as to be also relayed through the non-contact IC card reader function 12 and to supply electricity to the existing card reader 13, and therefore it becomes possible for both the non-contact IC card reader function 12 and the existing card reader 13 to be supplied with electricity through one and only electrical power supply line. As a result, it becomes possible to add the non-contact IC card reader function 12 without adding an electrical power supply line from the host apparatus 11.

Furthermore, as shown in FIG. 5, mostly an interface at a device side is less advanced in USB compatibility than a side at the host apparatus 11. If the side at the host apparatus 11 is compatible with USB, it becomes possible to have high-speed communication with the host apparatus 11 by making only the host interface 124 of the non-contact IC card reader function 12 compatible with USB even though the existing card reader 13 is not compatible with USB.

The medium processing system and the intermediary medium processing apparatus, which relate to at least an embodiment of the present invention, are able to take advantage of high-speed communication, and furthermore useful as being low-cost and practical.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A medium processing system for use with an information recording medium, the system comprising:
    a first medium processing apparatus structured to carry out writing and reading information data to and from the information recording medium;
    a host apparatus having an interface with which the first medium processing apparatus is connectable; and
    a second medium processing apparatus structured to intermediate a connection between the first medium processing apparatus and the host apparatus;
    wherein the second medium processing apparatus is structured to carry out writing and reading information data to and from the information recording medium at a higher speed than the first medium processing apparatus does.

2. The medium processing system according to claim 1, wherein the first medium processing apparatus is structured to carry out writing and reading magnetic data to and from an information recording medium; and
    the second medium processing apparatus is structured to carry out writing and reading information data to/from an information recording medium by means of electromagnetic induction in a non-contact manner.

3. The medium processing system according to claim 2, wherein the first medium processing apparatus includes an integrated circuit (IC) contact that contacts with an IC terminal placed on an information recording medium.

4. The medium processing system according to claim 1, wherein the second medium processing apparatus includes a buffer that temporarily stores a command from the host apparatus.

5. The medium processing system according to claim 4, wherein the buffer temporarily stores a command from the host apparatus to the first medium processing apparatus.

6. The medium processing system according to claim 5, wherein the buffer furthermore temporarily stores a command from the host apparatus to the second medium processing apparatus.

7. The medium processing system according to claim 6, wherein the control section is structured to judge whether a command from the host apparatus among commands stored in the buffer is for the first medium processing apparatus or for the second medium processing apparatus;
    the control section is structured to transfer the command to the first medium processing apparatus if the control section judges the command to be for the first medium apparatus; and
    the control section is structured to transfer the command to the communication section if the control section judges the command to be for the second medium processing apparatus.

8. The medium processing system according to claim 5, wherein the second medium processing apparatus comprises:
    a communication section that is structured to carry out writing and reading information data to and from the information recording medium; and a control section connected to the communication section and the buffer;

wherein the control section is structured to judge whether a command received from the host apparatus is for the first medium processing apparatus or for the second medium processing apparatus;

the control section is structured to transfer the command from the host apparatus to the buffer if the control section judges the command from the host apparatus to be for the first medium processing apparatus; and the control section is structured to transfer the command from the host apparatus to the communication station if the control section judges the command from the host apparatus to be for the second medium processing apparatus.

9. The medium processing system according to claim 1, wherein the second medium processing apparatus is structured to spontaneously control the first medium processing apparatus.

10. The medium processing system according to claim 1, wherein the second medium processing apparatus is structured to automatically recognize a sort of the first medium processing apparatus.

11. An intermediary medium processing apparatus comprising:

an intermediary of connection between a medium processing apparatus for writing and reading information data to and from an information recording medium and a host apparatus having an interface with which the medium processing apparatus is connectable;

wherein the intermediary medium processing apparatus is structured to carry out writing and reading information data to and from an information recording medium at a higher speed than the medium processing apparatus does.

* * * * *